Patented Jan. 25, 1927.

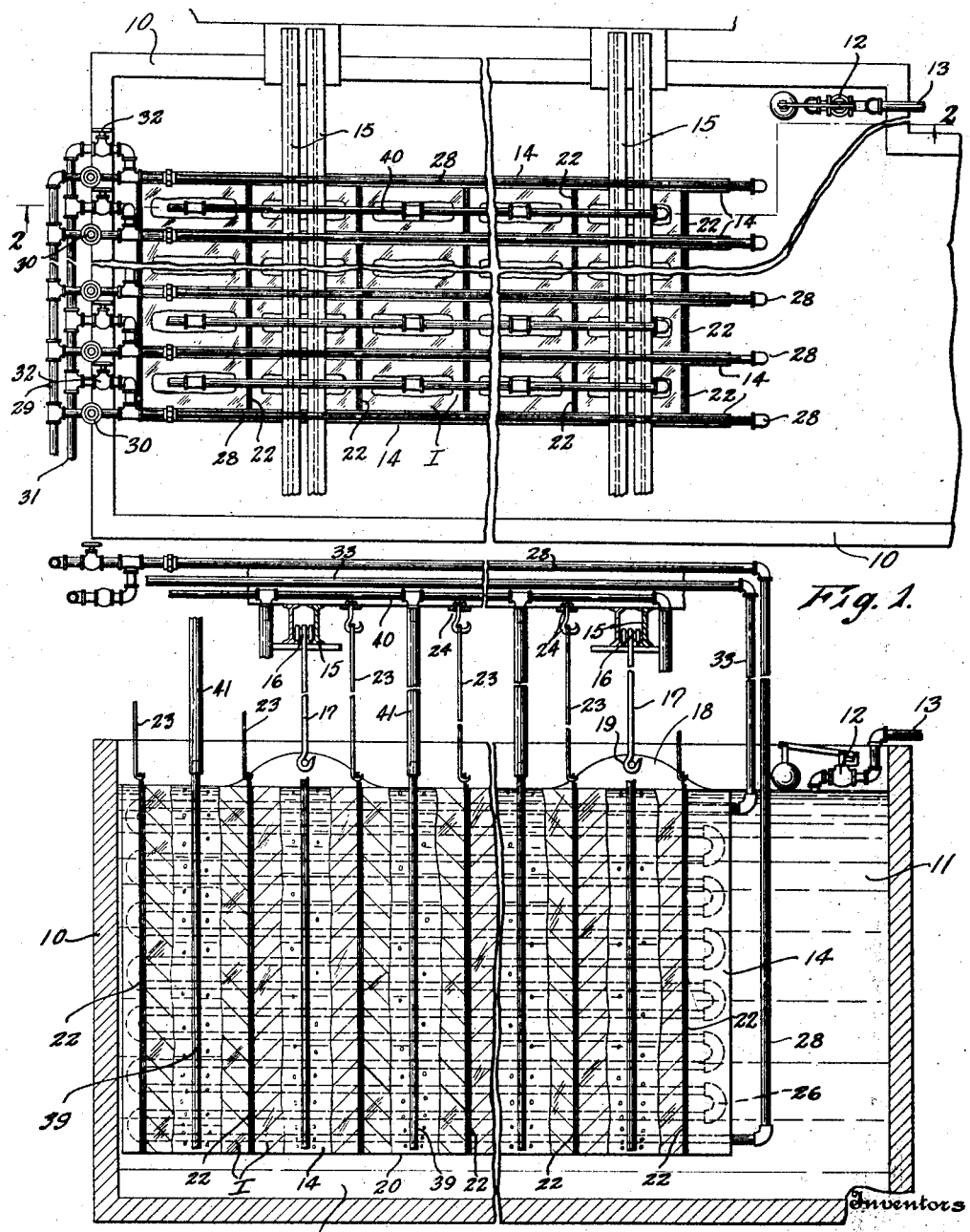

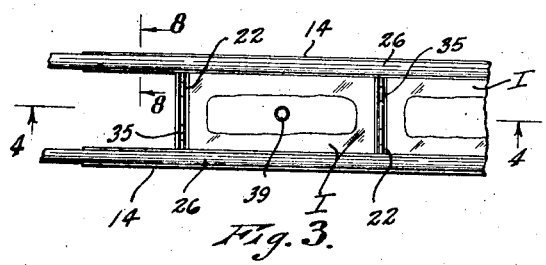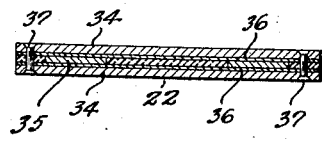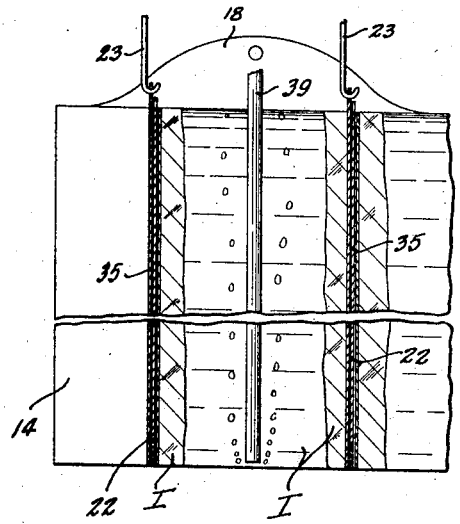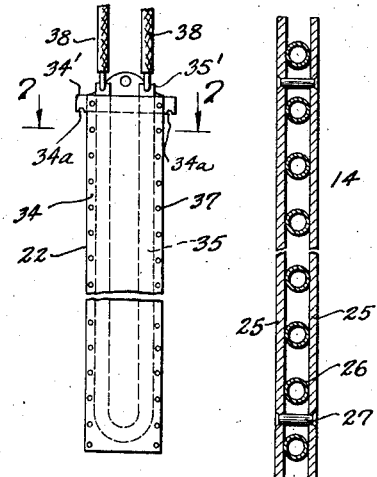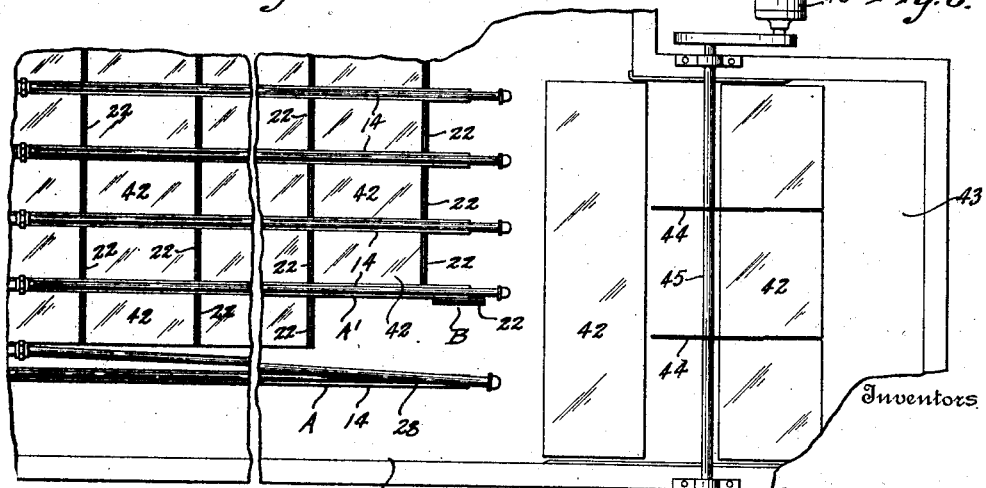

1,615,411

UNITED STATES PATENT OFFICE.

ROBERT L. SHIPMAN, OF TRUMBULL, AND EARL D. SPRAGUE, OF BRIDGEPORT, CONNECTICUT.

ICE-MAKING APPARATUS.

Application filed February 27, 1925. Serial No. 11,971.

This invention relates to an apparatus and process of making ice, and has for an object to provide an improved method and means for freezing ice which will be less expensive to install than the apparatus now generally employed, which will work faster and will give a better and more uniform product and in which the process of harvesting the ice is greatly simplified.

With the foregoing and other objects in view, we have devised the construction illustrated in the accompanying drawings forming a part of this specification, similar reference characters being employed throughout the various figures to indicate corresponding elements. In these drawings—

Fig. 1 is a top plan view of a portion of an installation employing our improved construction and process.

Fig. 2 is a vertical section through the same substantially on line 2—2 of Fig. 1.

Fig. 3 is a top plan view on an enlarged scale of two freezing plates and two dividing plates showing how the ice block builds up in the freezing operation.

Fig. 4 is a longitudinal central section substantially on line 4—4 of Fig. 3.

Fig. 5 is a top plan view of a portion of the device showing the method of harvesting the ice.

Fig. 6 is a side elevation of one of the dividing plates.

Fig. 7 is a transverse section of the same on an enlarged scale, the section being substantially on line 7—7 of Fig. 6, and Fig. 8 is a transverse section of one of the freezing plates on an enlarged scale, the section being substantially on line 8—8 of Fig. 3.

Heretofore devices for freezing ice by the plate method have been unsatisfactory because it was difficult to secure the ice in blocks of the proper size and shape, and great difficulty was experienced in harvesting the ice. Where the block was frozen onto a single plate only, not only was difficulty experienced in harvesting the ice but the apparatus was slow and expensive to operate because after a considerable thickness of ice had been frozen to the plate it took a great deal longer to freeze the remaining portion of the block as the heat had to be conducted through the considerable thickness of ice already frozen, and furthermore, the blocks would not be of uniform shape and thickness. Still further large and cumbersome apparatus was required to handle the large blocks of ice in harvesting. Where the ice was frozen from both directions from two spaced parallel freezing plates the device was much quicker in operation, but the block of ice formed separated in the center in handling where the two thicknesses of ice came together from the two plates, causing a great deal of waste and making the ice unsalable. We have in our apparatus provided a structure in which integral blocks of ice are built up simultaneously from all four sides of the desired dimensions in width and thickness, which will give a solid integral block similar to that secured in the can method which will not separate in the center, but which is an improvement over the ice secured by the can method as the block is not tapered and there is practically no core.

In carrying out our invention we provide a relatively large tank 10 to hold the water 11 for freezing purposes. The proper level of water is maintained automatically by a float controlled valve 12 controlling the water supply to the tank through a pipe 13 from any suitable source of supply. The water before being fed to the tank may be pre-cooled or otherwise treated as desired. We support in the tank a plurality of freezing plates 14, these plates being supported in spaced relation substantially parallel with each other and in the upright position as shown, and they are preferably supported by suspending them from suitable overhead supports. These supports in the showing in the drawings comprise I-beams 15 supported at their opposite ends by any suitable means, and between these beams are carriages 16 having wheels or rollers to run on the lower flanges of the I-beams and from which depend suspending rods 17 which are connected to the upper portions of the freezing plates. A convenient means of suspension are plates 18 secured to the freezing plates which are attached to hooks 19 on the lower ends of the suspending rods 17. The lower edges 20 of the freezing plates are spaced above the bottom of the tank 10 as shown in Fig. 2, to provide a free and unobstructive space 21 for a purpose presently to be described. It will be apparent that by this means of mounting the freezing plates they are movable laterally toward and from each other in the tank.

Located between the freezing plates 14 are a plurality of upright dividing plates 22. These plates are of a length substantially equal to the width of the freezing plates as shown in Figs. 2 and 4, and they are spaced from each other a distance equal to the width of the block of ice to be formed. They are supported between the freezing plates with their side edges preferably engaging the freezing plates, or practically the same result is secured if they are in close proximity to the freezing plates although not actually touching them, and these dividing plates are of a width equal to the thickness of the block of ice required. The dividing plates are preferably also freely suspended in the tank between the freezing plates and extended at substantially right angles thereto as shown, a convenient means of suspending them being a rod or wire 23 depending from suitable supports 24 and hooked in the upper end of the dividing plates. In setting up the apparatus a freezing plate 14 is suspended in proper position. The desired number of dividing plates 22 are then placed in proper spaced relation from each other on one side of the freezing plate with the side edges of the dividing plates engaging or closely adjacent the surface of the freezing plate. Another freezing plate is then moved to position at the other edges of the dividing plates. Other dividing plates are then similarly arranged on the opposite side of the second freezing plate. Then a third freezing plate is mounted at the opposite edges of the second set of dividing plates and so on until the desired number of plates have been mounted or the capacity of the tank has been filled.

The freezing plates 14 may be of any suitable or desired construction but are preferably composed of a pair of sheet metal plates 25 (Fig. 8) between which is located a zigzag coil of pipes 26 for the cooling fluid, and for best results the plates should be clamped against the opposite sides of the coil so as to secure a maximum conduction of heat thereto, the plates being secured to the coil by any suitable means, such as rivets 27. A pipe 28 leads from the lower end of the coil to a pipe 29 containing the expanding fluid such for instance as liquid ammonia, the ammonia being allowed to expand into the coil through an expanding valve 30. If preferred, a freezing brine may be passed through the coil. A second pipe 31 is also connected to the pipe 28 with suitable valves 32 in the connection between the two, the pipe 31 being employed to supply a warming fluid to the coil such as hot compressed ammonia vapors for the harvesting operation as will be described later. The top of the coil 26 is connected to a pipe 33 to conduct the gas back to the compressor.

The dividing plates 22 may be of any suitable construction but are preferably substantially as shown in Figs. 6 and 7. In this construction they comprise a pair of spaced metal plates 34 with a flat strip of iron or other suitable metal 35 mounted between them, this strip being electrically insulated from the plates 34 by means of fibre or other suitable sheets 36 the whole being clamped together by means of suitable rivets 37. The resistance heating element 35 is preferably substantially U-shaped as shown in Fig. 6, with its opposite ends 35' projecting above the upper end of the plate 22 for connection to suitable leads 38 which lead from any suitable source of current supply. As an easy means of mounting these plates in proper position a transverse support or strap 34' may be secured to the top of the plate and project beyond the edges thereof and rest on the top edges of the freezing plates 25. The strap may have notches 34ª in its lower edge to receive the edges of the freezing plates.

After the freezing and dividing plates have been arranged in the water in the tank as above described air pipes 39 are suspended in each rectangle enclosed between two freezing plates and two dividing plates, and are connected with a suitable source of compressed air such as the pipe 40 by means of flexible rubber connections 41. The lower ends of these pipes are placed at the desired position with respect to the lower edge of the freezing plate so that during the freezing operation the bubbles of air will rise and scour or clean the surface of the ice as it forms giving a clear transparent block of ice.

After the plates have been assembled as described the freezing plates 14 are cooled by expanding liquid ammonia in the coil 26. As the edges of the dividing plates 22 are in contact with or closely adjacent the surfaces of the freezing plate these dividing plates will conduct heat to the freezing plates so that the blocks of ice will grow or build up as an integral block simultaneously from all four sides of the rectangle enclosed between two adjacent freezing plates 14 and two adjacent dividing plates 22 as shown at (I) in Figs. 1, 2, 3 and 4. It is preferred that the side edges of the dividing plates should engage the surface of the freezing plates as the heat transfer from these plates to the freezing plates is a maximum under these conditions, but we have found in actual practice that satisfactory results are secured if they are not actually in contact but are closely adjacent, as then the amount of ice between the plates is not sufficient to greatly interfere with the transfer of heat, and it is very difficult in actual operation to construct the plates of such uniform dimensions that they will contact throughout their entire heights.

It will be apparent from the foregoing description that as the ice block will grow or build up simultaneously as an integral structure on all four sides of the block from the surfaces of the freezing and dividing plates this apparatus will be very rapid, greatly reducing the time required for a freezing operation, also that there will not be a line of cleavage through the center of the block which will cause the block to split open or separate in the middle when handling. Furthermore, as the rectangular space between two freezing plates and two dividing plates is entirely open at the bottom and as the plates are spaced above the bottom of the tank as shown at 32, any sediment or impurities in the water will be frozen out and will drop to the bottom of the tank giving a clear and uniform block of ice. We are thus able to freeze the block from all four sides with our device as in the can method, but we can secure a block of ice free from core without drawing the core as is necessary in the can method.

After the freezing operation has been completed a solid block of ice fills the rectangular spaces between two adjacent freezing plates and two adjacent dividing plates, as shown in Fig. 5. The expansion valves 30 are then closed and hot compressed ammonia gas is allowed to flow through valve 32 into the coil 26 in the outer freezing plate 14 to separate this plate from the block of ice. The outside plate (A) may then be moved laterally away from the ice as shown in Fig. 5. Hot ammonia may then be passed through the coil 26 in the next freezing plate which frees the long block of ice and allows it to float free from the freezing plate. Leads 38 from a suitable source of electric current may then be placed in contact with the upper ends of the iron strip 35, as shown in Fig. 6, for the dividing plates 22 in succession beginning with the outside division plate (B). This quickly heats the plate and causes it to separate from the block of ice. As the dividing plates 22 are heated in succession the blocks of ice 42 are separated and float in the tank. These blocks will, of course, be of a length equal to the height of the freezing and dividing plates. In practice we have made them substantially eight feet long and have then cut them up into two or more blocks, the distance between the freezing plates being about ten inches and between the dividing plates about twenty-four inches, although, of course, any other dimensions may be employed as is found desirable. As the dividing plates 22 are freed from the blocks the suspending element 23 allows them to swing laterally and out of the way up against the surface of the freezing plate as shown at (B) in Fig. 5, to allow the block of ice to float away from them into the free portion of the tank. After one row of blocks has been harvested the next freezing plate (A') is moved away from the next row of blocks, the next freezing plate is heated to free the second row of blocks and the dividing plates in this row are heated one by one and the ice blocks removed and so on until the entire amount has been harvested.

As a convenient means of cutting up these blocks after they have been freed from the plates without breakage and consequent waste we provide an extension of the tank at one side thereof as shown at 43 which forms a harvesting section in the tank, and mount in this extension one or more saws 44 carried by a shaft 45 which is rotated by a suitable motor 46, these saws being mounted to project down into the water so that as the block of ice 42 is floated into the extension, it being guided by the side walls or other means, it will be cut into suitable lengths by the saws while it floats on the water. We have found that as the block is supported by the water there is very little breakage during the cutting operation. We are, of course, not limited to this means of cutting the blocks as they may be first lifted from the tank and then cut on a suitable support by saws.

In the drawings we have shown a single set of freezing and separating plates, but it will, of course, be apparent that the tank may be made of sufficient size for the installation of two or more sets of these plates. If two sets are used they are preferably spaced from each other a sufficient distance to leave a space or lane between them for harvesting the ice from both sets as above described, the offset 43 leading from this space or lane.

It will be apparent from the foregoing description that the freezing plates may be arranged in parallel relation and that the dividing plates may also be arranged in parallel relation so that the blocks of ice are the same width and thickness throughout. This will overcome the objection of the taper required in the can method, the taper in the latter method being required to free the blocks from the cans. This installation is much cheaper and requires less space than the can method, although it is just as rapid because, as described above, the blocks are frozen simultaneously from all four sides. In the can method if a can should leak brine enters the can spoiling the ice, and furthermore, each can must be filled individually. In harvesting in the can method the cans must be lifted out of the brine individually and heated to free the ice block and then replaced in the brine. This obviously requires a large labor expense in harvesting.

Our construction and arrangement furthermore overcomes the difficulties in harvesting the ice which were met in the old plate systems which were heretofore employed as the ice is frozen in relatively small blocks which are easily separated from the plates.

Having thus set forth the nature of our invention, what we claim is:

1. In an ice making apparatus, a tank containing water to be frozen, spaced freezing plates movably supported in an upright position in the tank with their bottom edges spaced above the bottom of the tank to provide a settling zone beneath the lower edges of the plates, spaced upright movable division plates between the freezing plates and forming heat conductors so that an integral block of ice will build up on all four sides from the freezing and division plates, and means for heating the plates.

2. In an ice making apparatus, a tank containing water to be frozen, spaced freezing plates movably suspended in an upright position in the tank with their bottom edges spaced above the bottom of the tank to provide a settling zone beneath the lower edges of the plates, spaced movable division plates supported in an upright position between the freezing plates and substantially in contact therewith to conduct heat to the freezing plates so that an integral block of ice will build up on all four sides from the freezing and division plates, and means for heating the plates to separate them from the frozen block.

3. In an ice making apparatus, a tank containing water to be frozen, a plurality of spaced upright freezing plates movably supported in the tank with their lower edges spaced above the bottom of the tank to leave a free open space below the plates to form a settling zone beneath their lower edges, a plurality of movable spaced upright dividing plates between the freezing plates with their edges closely adjacent thereto to conduct heat to said plates to cause an integral block of ice to build up on all four sides from the freezing and dividing plates, the lower ends of the dividing plates being also spaced above the bottom of the tank, and an insulated electric heating element in the dividing plates for heating the same to separate them from the ice blocks.

4. In an ice making apparatus, a tank containing water to be frozen, a plurality of spaced upright freezing plates freely suspended for movement in the tank with their lower edges spaced above the bottom of the tank to provide a settling zone beneath the lower edges of the plates, a plurality of movable spaced upright dividing plates between the freezing plates with their edges in close proximity to the freezing plates to conduct heat thereto and cause an integral block of ice to build up from all four sides on two adjacent freezing and dividing plates, means for freely suspending the dividing plates with their lower ends above the bottom of the tank, and an electric heating element in the dividing plates.

5. In an ice making apparatus, a tank containing water to be frozen, spaced upright movable freezing plates in said tank, spaced upright movable dividing plates between the freezing plates with their edges closely adjacent the freezing plates to conduct heat thereto and cause an integral block of ice to build up on all four sides from two adjacent freezing plates and two adjacent dividing plates, and means for heating the plates, said freezing plates terminating short of one end of the tank to provide a harvesting section in the tank.

6. In an ice making apparatus, a tank containing water to be frozen, spaced freezing plates movably supported in an upright position in the tank with their lower edges spaced above the bottom of the tank to provide a settling zone beneath the lower edges of these plates in free communication with the space between the plates, spaced upright division plates movably supported between the freezing plates and extending in a direction substantially normal to the planes of the freezing plates, and means for heating the plates, said tank being extended beyond one end of the freezing plates to provide a harvesting section in the tank.

7. In an ice making apparatus, a tank containing water to be frozen, a plurality of upright spaced freezing plates suspended for movement in the tank with their lower edges spaced above the bottom of the tank to provide a settling zone beneath the lower edges of the plates in free communication with the space between the plates, a plurality of spaced division plates movably suspended in an upright position between the freezing plates, and means for heating the plates to free them from the blocks of ice, said tank being provided with an extension beyond one end of the freezing plates to form a harvesting section in the tank.

In testimony whereof we affix our signatures.

ROBERT L. SHIPMAN.
EARL D. SPRAGUE.